United States Patent [19]

Hinnen et al.

[11] Patent Number: 5,621,586
[45] Date of Patent: Apr. 15, 1997

[54] RETAINING SLOT FOR DATA CARTRIDGE LIBRARY SYSTEM

[75] Inventors: Bennett C. Hinnen; Hai T. Ho, both of Westminster; Eric A. Rinard; Gregory S. Rinard, both of Boulder; Brian A. Ruff, Denver; Nathan C. Thompson, Boulder; Hossein Zia-Shakeri, Louisville, all of Colo.

[73] Assignee: Western Automation Laboratories, Inc., Boulder, Colo.

[21] Appl. No.: 610,482

[22] Filed: Mar. 4, 1996

Related U.S. Application Data

[63] Continuation of Ser. No. 374,160, Jan. 17, 1995, Pat. No. 5,555,143.

[51] Int. Cl.⁶ .................................................. G11B 15/68
[52] U.S. Cl. ........................................................ 360/92
[58] Field of Search ............................................ 360/92

[56] References Cited

U.S. PATENT DOCUMENTS 5,555,143   9/1996   Hinnen et al. ..................... 360/92

Primary Examiner—John H. Wolff
Attorney, Agent, or Firm—Sheridan Ross P.C.

[57] ABSTRACT

A storage system (10) is disclosed that provides random access storage/retrieval of data on data cartridges within the storage system (10). In one embodiment, the storage system (10) includes a storage array (20), a player/recorder device (22), a guard device (80) and a cartridge transport device (40). The player/recorder device (22) and the transport device (40) are positioned on substantially opposite sides of the storage array. The transport device (40) moves cartridges between the storage array (20) and the player/recorder device (22). The guard device (80) pushes a prolapsed data cartridge back into the storage array (20) and/or limits the distance a data cartridge will prolapse from the storage array (20).

22 Claims, 7 Drawing Sheets

RETAINING SLOT FOR DATA CARTRIDGE LIBRARY SYSTEM

This is a continuation of application Ser. No. 08/374,160, filed Jan. 17, 1995, now U.S. Pat. No. 5,555,143.

FIELD OF THE INVENTION

This invention relates generally to data storage and retrieval, and more particularly to an improved apparatus for storing and retrieving data cartridges.

BACKGROUND

There exists a need in the marketplace to store/retrieve large amounts of data/information in a compact volume while making the data/information readily available. A particularly challenging application for a data storage systems is in use with compact data processing systems. The volume and orientation allowed for a storage system depends upon the space available inside or adjacent to the data processing system. For example, UNIX based processing systems often provide a rack in which a data storage systems can be horizontally mounted. Data storage systems are often positioned vertically adjacent to personal computer based processing systems to minimize the floor/desk area occupied by the storage system.

One type of storage system that can store/retrieve large amounts of data includes a plurality of data cartridges (e.g. tape cartridge/cassettes or disks) which are stored in an array of storage slots, a data read/write device (e.g. tape drive or disk drive), and a transport device. Data is stored on the data cartridges. When data is to be transferred from/to the storage system, a data cartridge is moved by the transport device from a storage slot to the data read/write device which transfers the desired data. After completion of the data transfer, the transport device returns the data cartridge to a storage slot.

The storage capacity of a storage system can be increased by increasing the number of storage slots and the corresponding number of data cartridges. The time required to store/retrieve data (i.e. data access time) can be decreased by utilizing multiple data read/write devices thereby providing simultaneous access to several data cartridges within the storage system.

Some known storage systems arrange the storage slots in a linear or a circular array. For linear storage arrays, the data read/write device(s) is generally placed adjacent to and aligned with an end of the storage array so that the transport device can travel along a linear path and face the openings of the storage slots and the read/write device. A limitation of a linear arrangement of the storage array and the read/write device(s) is the relatively large size of the storage system and the slow data access times for data cartridges which are distant from the read/write device.

For circular arrays, the data read/write device is generally interposed between storage slots and the transport device is placed near the center of the circular array so that the transport device can rotate and access the openings of the storage slots and the data read/write device.

A limitation of these types of storage systems is that the read/write device physically occupies space that would otherwise be available for use as storage slots, thereby decreasing the storage capacity of the storage system. An increase in the number of data read/write devices requires a substantial decrease in storage capacity and/or a substantial increase in the physical volume of the storage system. Some storage systems compensate for this loss of storage slots by increasing the volume of the storage array such as by increasing the width/diameter of the arrangement of storage slots or by utilizing two dimensional stacking (e.g. a box arrangement or a cylindrical arrangement) of the storage slots. The large volume, small storage capacity, and/or slow data access times of these known storage systems precludes their use in many applications, such as with some compact data processing systems.

Many storage devices can operate in substantially one predetermined orientation. For example, some storage systems utilize gravity to retain the data cartridges in the storage slots by tilting the insertion/removal end of the slot upward. Such storage systems are limited to an orientation in which the weight of the data cartridges retains them in the slots. Other storage systems utilize a storage array that rotates in a substantially horizontal plane about an axis to position a storage slot adjacent to the transport device. If the storage array is oriented so that the data cartridges are rotated along a different plane, a number of problems are encountered, especially if there is an uneven distribution of data cartridges in the array. For example, a varying amount of power is needed to accelerate/decelerate the storage array into a selected position which, in turn, increases the complexity .of accurately controlling movement of the storage array. Furthermore, vibrational problems are generated by such a rotating storage array.

SUMMARY OF THE INVENTION

Accordingly, objectives of the present invention include the following:

To provide a data storage system that increases the storage capacity for storing/retrieving data cartridges and provides one or more player/recorder devices while accommodating size/volume limitations of the system.

To provide a data storage system that provides reliable operation for a number of different orientations of the system.

To provide a data storage system that pushes a data cartridge that has at least partly fallen out of a storage slot back into the slot and/or limits the distance that a data cartridge can fall out of a slot.

Additional objectives will be apparent upon consideration of the following description.

The various aspects of the present invention are embodied in a storage system that provides random access storage/retrieval of data/information on data cartridges within the system. The storage system is compatible with data cartridges of varying dimensions/formats such as the industry standard 4 mm and 8 mm tape cassettes.

According to one aspect of the present invention, a storage system is provided that has an increased capacity for storing data cartridges while accommodating size/volume limitations of the system. The storage system includes an array of slots, a player/recorder device(s), and a cartridge transport device. The storage capacity of the system is increased by positioning the player/recorder device(s) and the transport device on substantially opposite sides of the storage array. The transport device moves cartridges between the storage array and the player/recorder devices(s).

In one embodiment a data cartridge is moved between a storage slot and a player/recorder device along a path through an opening in the storage array. The opening in the storage array is created by replacing a storage slot with a pass-through slot that allows a data cartridge to enter/exit from either end of the slot. In this manner, a player/recorder device has the effect of reducing the storage capacity of the storage array by a single slot. Multiple player/recorder devices can be used in the system with the loss of about one storage slot for each player/recorder device. As can be appreciated, this arrangement of the storage array, player/recorder device(s), and transport device is advantageous for maximizing the number of storage slots and thereby increasing the storage capacity of the system while accommodating size/volume limitations of the system.

According to another aspect of the invention, the storage system includes a storage array, a transport device, and a guard device that pushes a data cartridge that has at least partly fallen out of a slot back into the storage slot and/or limits the distance that a data cartridge can fall out of a storage slot. A data cartridge can fall out of a slot due to conditions such as vibrations, a faulty mechanism for retaining the cartridge in a slot, and/or incorrect placement of the cartridge in a slot by the transport device.

In one embodiment the guard device includes a member that is moved across the storage array at a predetermined distance from the storage slots to contact a data cartridge that has fallen out of a storage slot and to push the cartridge back into the storage slot.

In another embodiment the guard device includes a surface that is positioned adjacent to and extends along the storage array to limit the distance that a data cartridge can fall out of a storage slot. The transport device is generally aligned with a recessed area and operatively associated with the guard device to maintain the alignment as the transport device is moved.

For circular storage arrays, the guard device generally includes an eccentric perimeter surface that is rotated along the inside perimeter of the circular storage array. The eccentric perimeter surface limits the distance that a data cartridge can fall out of a storage slot to the width of the gap between the eccentric surface and the opening of the slot. As the guard device is rotated, a portion of the eccentric perimeter surface contacts any data cartridges that have fallen out of their slots and pushes the data cartridges back into their slots. In this manner, the guard device improves the reliability of the storage system operating under conditions such as varying orientations of the storage system and/or vibrations.

According to another aspect of the invention, an improved slot is provided. In one embodiment the slot includes an integrally formed elastic member at an end of the slot which retains a data cartridge within the slot. The integral elastic member simplifies the manufacture of the slot and serves to reliably retain a data cartridge within the slot under conditions such as varying orientations of the storage system and/or vibrations. Furthermore, the elastic member is formed to prevent insertion of a data cartridge which has an orientation relative to the slot different than a predetermined orientation. In another embodiment the slot includes a removable/breakable tab at an end of the slot for retaining a data cartridge. The tab is removed/broken to create a pass-through slot that permits a transport device that is positioned on one side of the storage array to transfer data cartridges to and from a player/recorder device positioned on the other side of the array. In this manner, a slot can be easily modified to serve as either a cartridge storage slot or a pass-through slot. In another embodiment the slot includes an integrally formed mounting clip and a locating boss for positioning and mounting the slot adjacent to another slot. The mounting clip and locating boss simplify the assembly of the slots into a storage array. In another embodiment the slot includes a recessed surface on a side of the slot that serves to limit the movement of an elastic member of an adjacent slot. The recessed surface can be formed to prevent overextension of the elastic members in a storage array and thereby prevent breakage thereof.

BRIEF DESCRIPTION OF THE DRAWINGS

For a more complete understanding of the present invention and further advantages thereof, reference is now made to the following Detailed Description, taken in conjunction with the Drawings, in which.

DETAILED DESCRIPTION OF THE INVENTION

Figure 1:
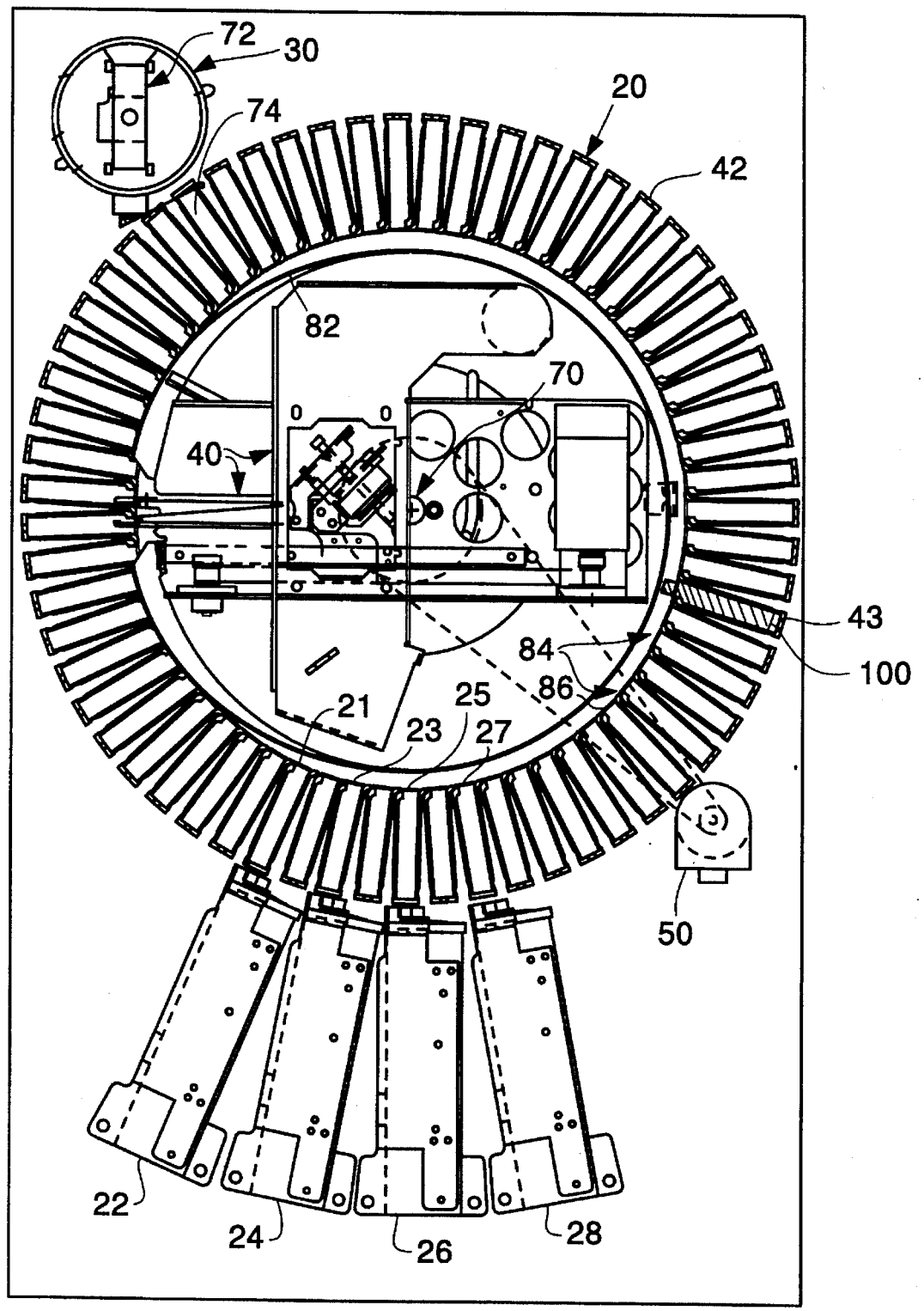
FIG. 1 is a plan view of a data cartridge library system showing the orientation of a storage array, four player/recorder devices, and a cartridge transport device according to an embodiment of the present invention.

With reference to FIG. 1, there is shown a plan view of a storage system 10 constructed according to an embodiment of the present invention. The storage system 10 includes a storage array 20, player/recorder devices 22, 24, 26, 28, a rotating entry/exit device 30 that permits data cartridges to be inserted and removed from the system 10, and a transport device 40. The storage array 20 is formed from slots 42 arranged about a center 70. The slots 42 are joined together to form the storage array 20 that can be replaced as a whole.

The storage system 10 stores large amounts of data/information on data cartridges that are stored in the slots 42. The storage capacity of the storage system 10 depends upon the number of slots in the storage array 20 in which data cartridges can be stored. A high storage capacity in achieved in a relatively low volume by positioning the transport device 40 on one side of the storage array 20 and positioning the player/recorder devices 22, 24, 26, 28 on the other side of the storage array 20. The storage array 20 is stationary to improve the operation of the storage system 10 is varying orientations. A data cartridge is moved by the transport device 40 between a storage slot 42, and a player/recorder device 22 through an opening in the storage array which is formed from a slot 21. Likewise, a data cartridge is moved between the storage array 20 and player/recorder devices 24, 26, and 28 through slots 23, 25, and 27 respectively. In this manner, each player/recorder device 22, 24, 26, and 28 has the effect of reducing the storage capacity of the storage array 20 by a single slot. It is an advantage of the present invention that a storage system can operate with multiple player/recorder devices with a reduced impact on the storage capacity of the system.

Multiple player/recorder devices are advantageous for reducing the time required to store/retrieve data in the storage system, i.e. the data access time. The player/recorder devices 22, 24, 26, 28 can be loaded with a data cartridge by the transport device 40 to provide access to four data cartridges at the same time.

A further advantage of this invention is that the storage capacity of the storage system 10 is highly independent of the size or type of player/recorder device. The player/recorder devices 22, 24, 26, 28 can be selected from devices which are well known in the art, such as tape drives that can read/write data on industry standard 4 mm or 8 mm tape cassettes.

Figure 2:
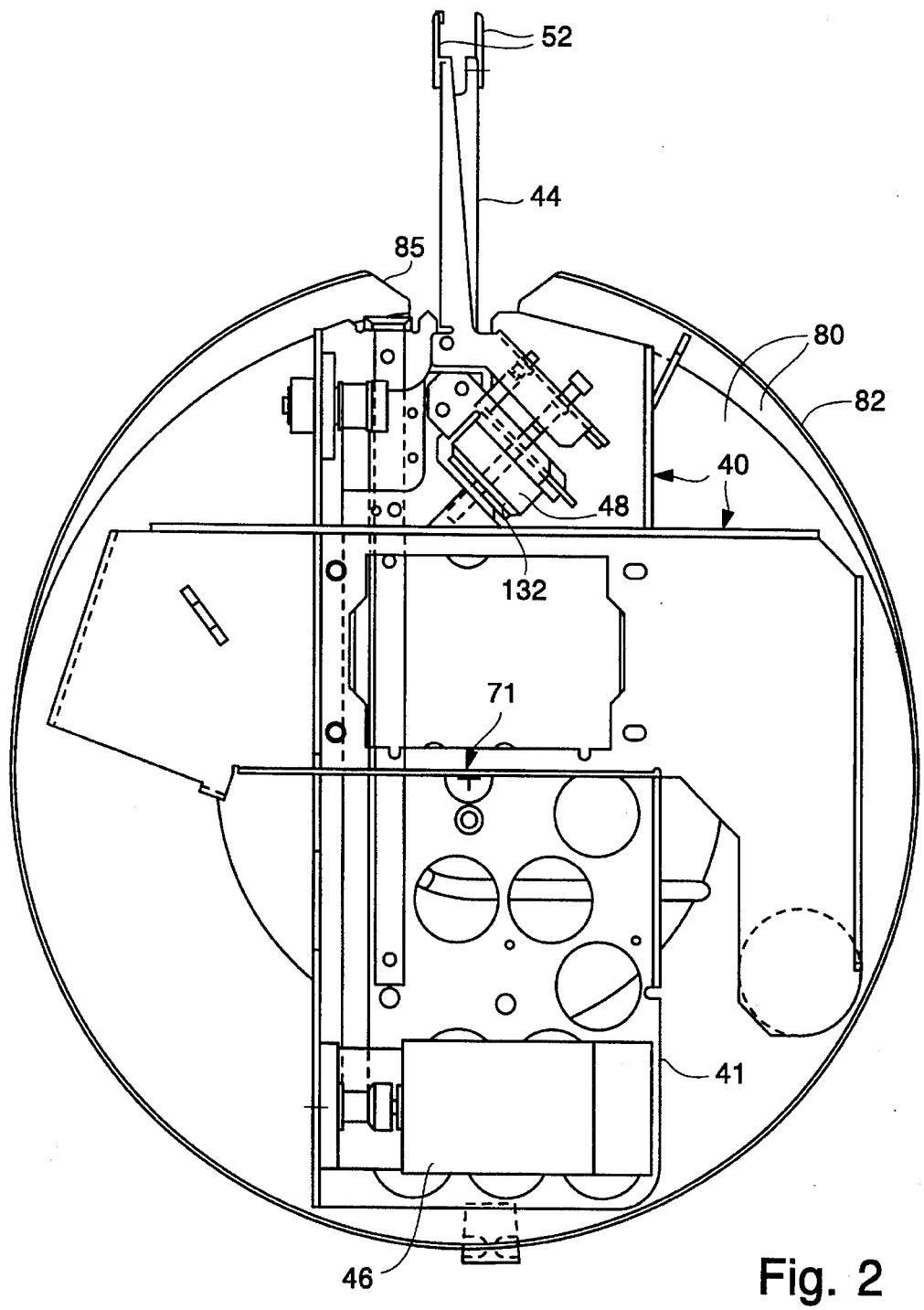
FIG. 2 is a plan view of the cartridge transport device of FIG. 1.

With reference now to FIG. 2, an enlarged view of the transport device 40 of FIG. 1 is shown. The transport device 40 illustrated in this embodiment includes a body 41 mounted to rotate angularly about an axis 71, a movable grasping device 44 supported by the body 41 that is radially slidable relative to the axis 71, a first motor 46 for radially positioning the grasping device 44, a solenoid 48 for actuating the grasping surfaces 52 to grip a data cartridge, and a second motor 50 (FIG. 1) for angularly rotating the body 41 about the axis 71 to position the grasping device 44 in front of a slot. To make the radial distance that the grasping device 44 is moved to grasp a data cartridge substantially the same for each slot, the body 41 of the transport device 40 is mounted so that the axis 71 of the transport device 40 is substantially coincident with the center 70 of the storage array 20.

A user of the storage system 10 inserts or removes a data cartridge through the entry/exit device 30. The data cartridge is inserted into a cartridge holder 72 by the user. The entry/exit device 30 rotates to align the cartridge with a slot 74 where the cartridge is moved by the transport device to a storage slot or a player/recorder device. Likewise, a data cartridge is removed from the storage system 10 by the entry/exit device 30 which receives a data cartridge from the transport device 40 and rotates to pass the cartridge to a user.

According to another aspect of the present invention, a guard device 80 is provided that pushes a prolapsed data cartridge (i.e. a data cartridge that extends an incorrect distance out of a storage slot) back into a storage slot and/or limits the distance that a data cartridge will prolapse from the storage array 20. With further reference to FIGS. 1–2, an embodiment of a guard device 80 is illustrated.

The guard device 80 includes an eccentric perimeter surface 82 that is supported by the body 41 of the transport device 40 above lower edge of the slots and rotated angularly about the axis 71 with the body 41. The guard device 80 includes a recessed area 85 (FIG. 2) that is aligned with the grasping device 44 to provide space for the grasping device 44 to radially move a data cartridge. As illustrated in FIG. 1, the distance that a data cartridge will prolapse from a storage slot is limited by the gap 84 between the eccentric perimeter surface 82 and the inner perimeter 86 of the storage array 20. For example, a data cartridge 100 (FIG. 1) has slid partially out of the slot 43 and contacted the perimeter surface 82 of the guard device 80. The guard device 80 has limited the distance that the data cartridge 100 can slide out of the slot 43. The size of the gap 84 varies around the inner perimeter 86 of the storage array 20. As the guard device 80 is rotated, a portion of the eccentric perimeter surface 82 contacts the prolapsed data cartridge 83 and pushes the data cartridge back into the slot 43 and thereafter retained by the slot 43.

According to another aspect of the present invention, an improved slot is provided. With reference now to FIGS. 3–10, a slot according to an embodiment of the present invention is shown. The slot can serve as either a storage slot or as a pass-through slot. A storage slot retains a data cartridge within the slot under conditions such as varying orientations of the storage array and/or vibrations. A pass-through slot allows a data cartridge to-enter/exit from either end of the slot.

Figure 3:
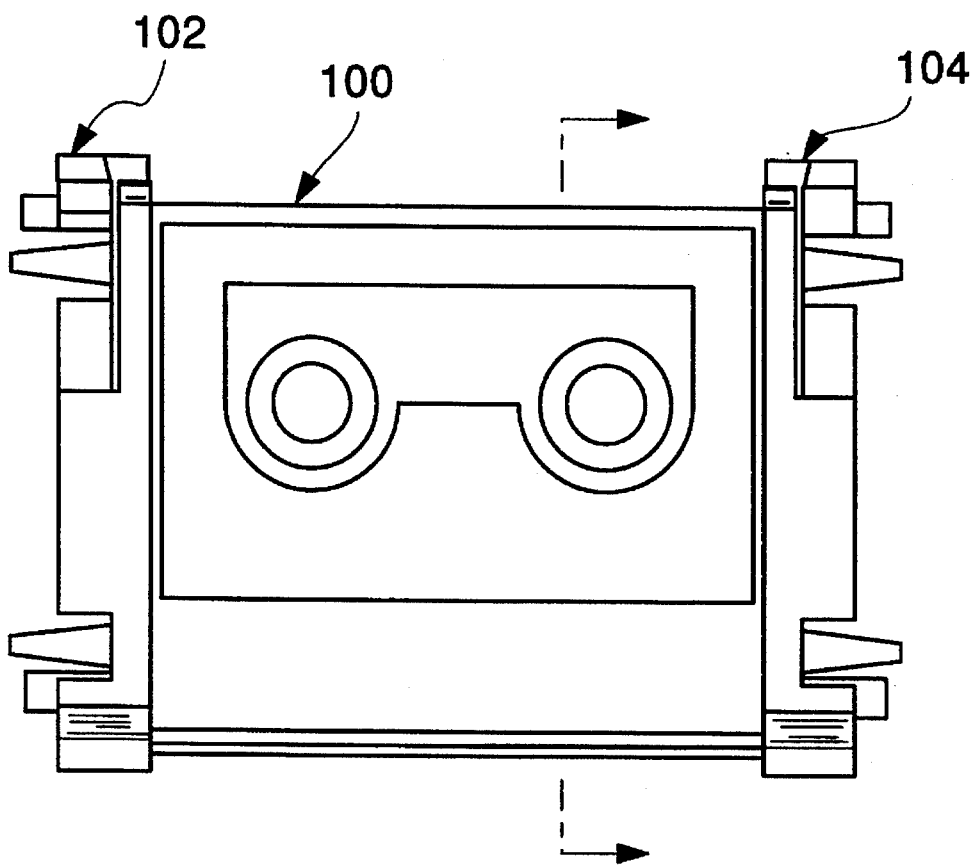
FIG. 3 is a plan view of a slot retaining a data cartridge.
Figure 4:
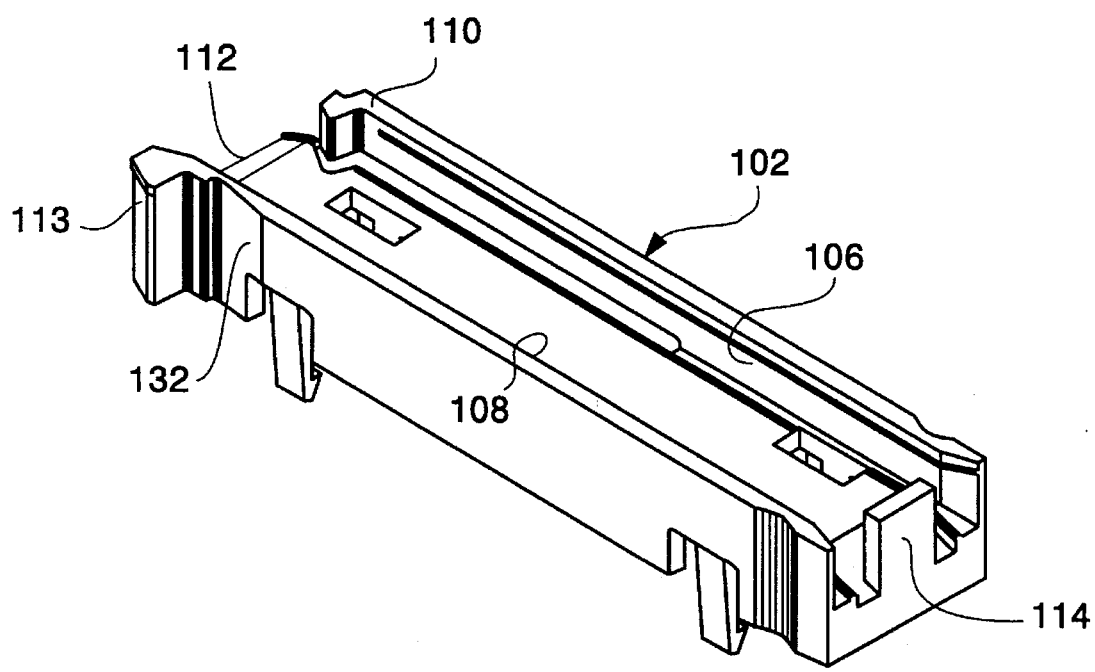
FIG. 4 is a perspective view of one half of a slot according to an embodiment of the present invention.
Figure 5:
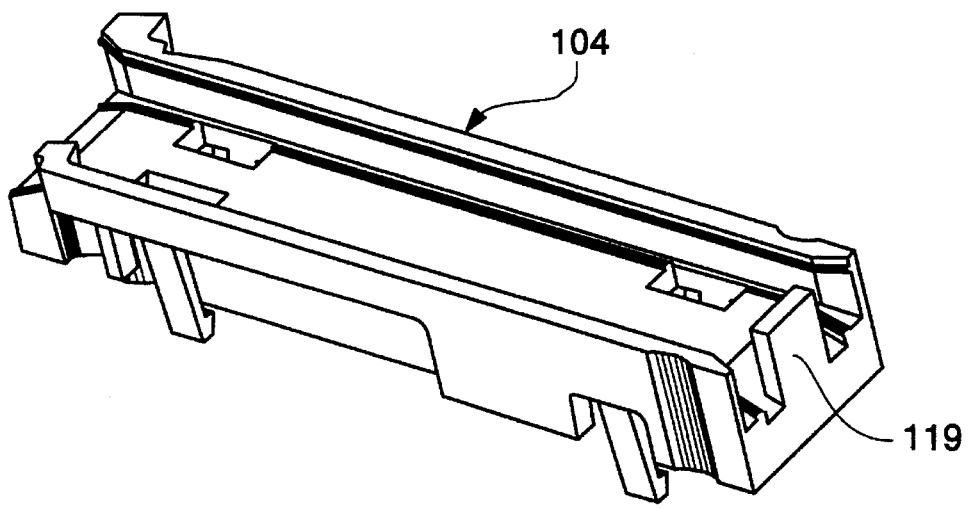
FIG. 5 is a perspective view of the other half of a slot according to an embodiment of the present invention.
Figure 7:
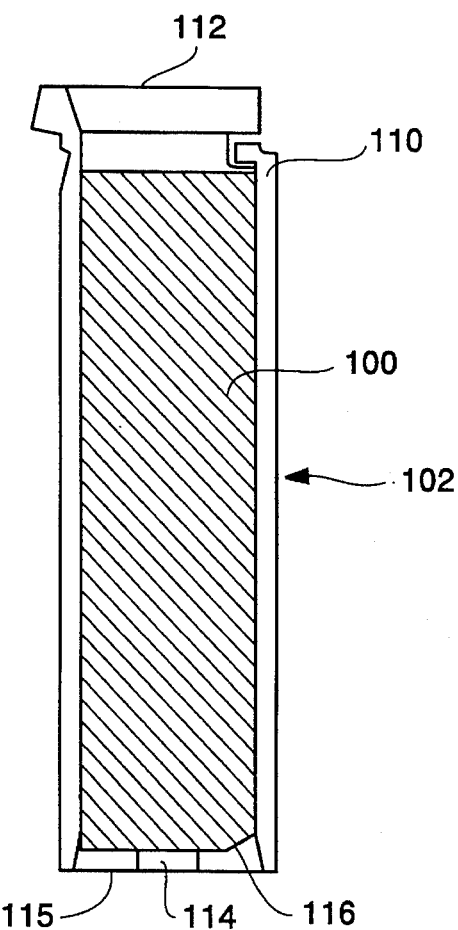
FIG. 7 is a top view of the half slot of FIG. 4 with a data cartridge retained within the slot.

With reference to FIGS. 3–5, a slot is shown with the data cartridge 100 inserted. The slot includes a pair of guides 102 and 104 which are arranged on opposite sides of the data cartridge 100. With reference to FIG. 4, the guide 102 includes sidewalls 106 and 108 which serve to direct a data cartridge into the slot, an integrally formed elastic member 110 at an end 112 of the slot, a ramp surface 113 at the end 112, and a tab 114 at an opposite end of the slot. FIG. 7 shows a top view of the guide of FIG. 4 retaining a data cartridge with the tab 114 and the elastic member 110. The tab 114 prevents movement of a data cartridge past the end 115. The elastic member 110 resists movement of a data cartridge past the end 112. In this manner, a data cartridge is retained within a slot independent of the orientation of the storage system 10. A pass-through slot is created by removing/breaking the tabs 114 and 119 (FIGS. 4–5).

Figure 6:
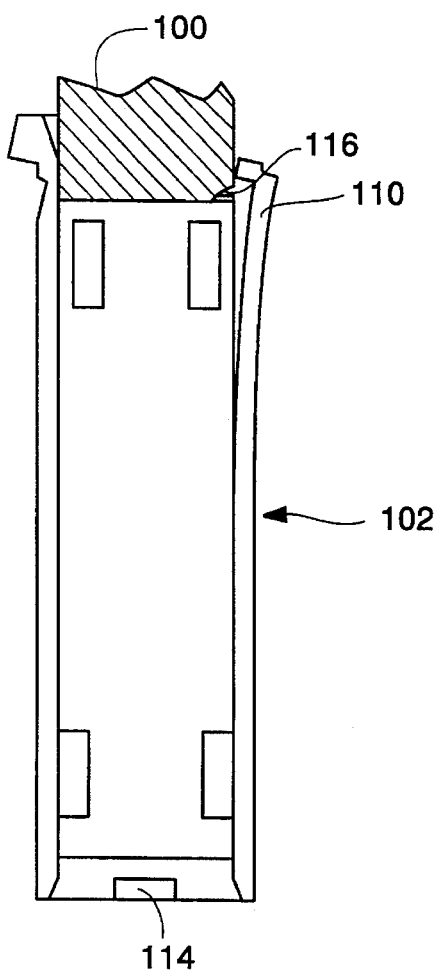
FIG. 6 is a top view of the half slot of FIG. 4 with a data cartridge being inserted.

The elastic member 110 further resists insertion of the data cartridge 100 in an incorrect orientation. FIG. 6 shows a top view of the data cartridge 100 being inserted into the guide 102 of FIG. 4. For a particular orientation of the data cartridge 100, a chamfered edge 116 contacts and pushes open the elastic member 110 to allow insertion of the data cartridge 100.

Figure 8:
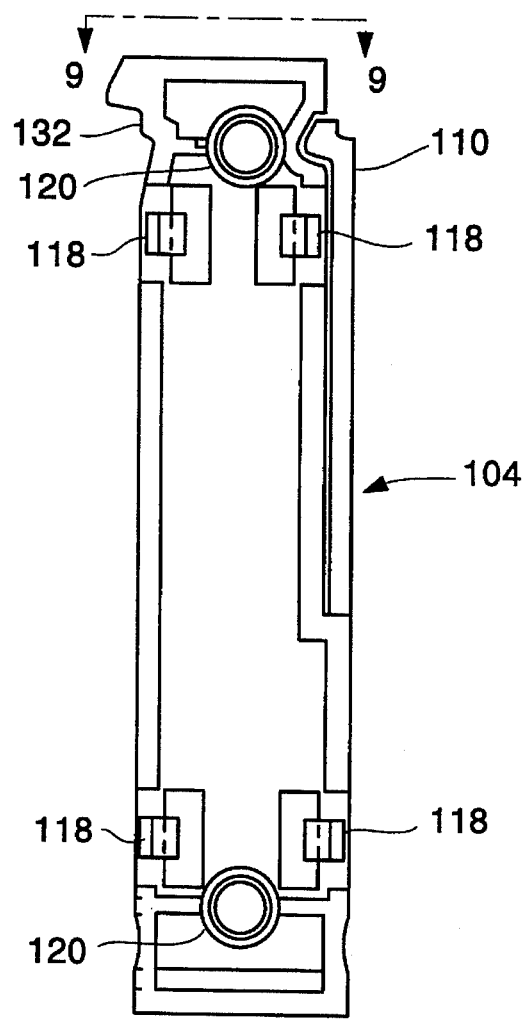
FIG. 8 is a bottom view of the half slot of FIG. 4.
Figure 9:
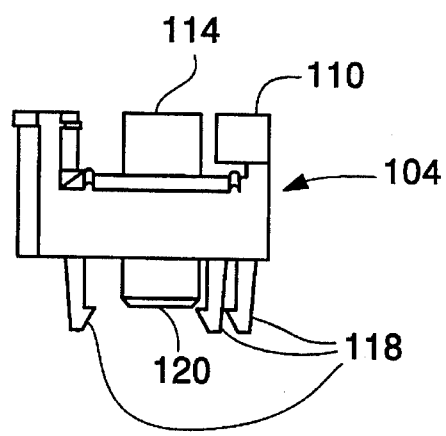
FIG. 9 is an end view along line 9—9 of the half slot of FIG. 8.

With reference now to FIGS. 8–9, a bottom view (FIG. 8) and an end view (FIG. 9) along line 9—9 of the guide 104 of FIG. 8 show features of the guide that simplify assembly of the guides into a storage array. The guide 104 further includes integrally formed mounting clamps 118 and locating bosses 120 for positioning and mounting the guide 104 adjacent to another guide to form a storage array.

Figure 10:
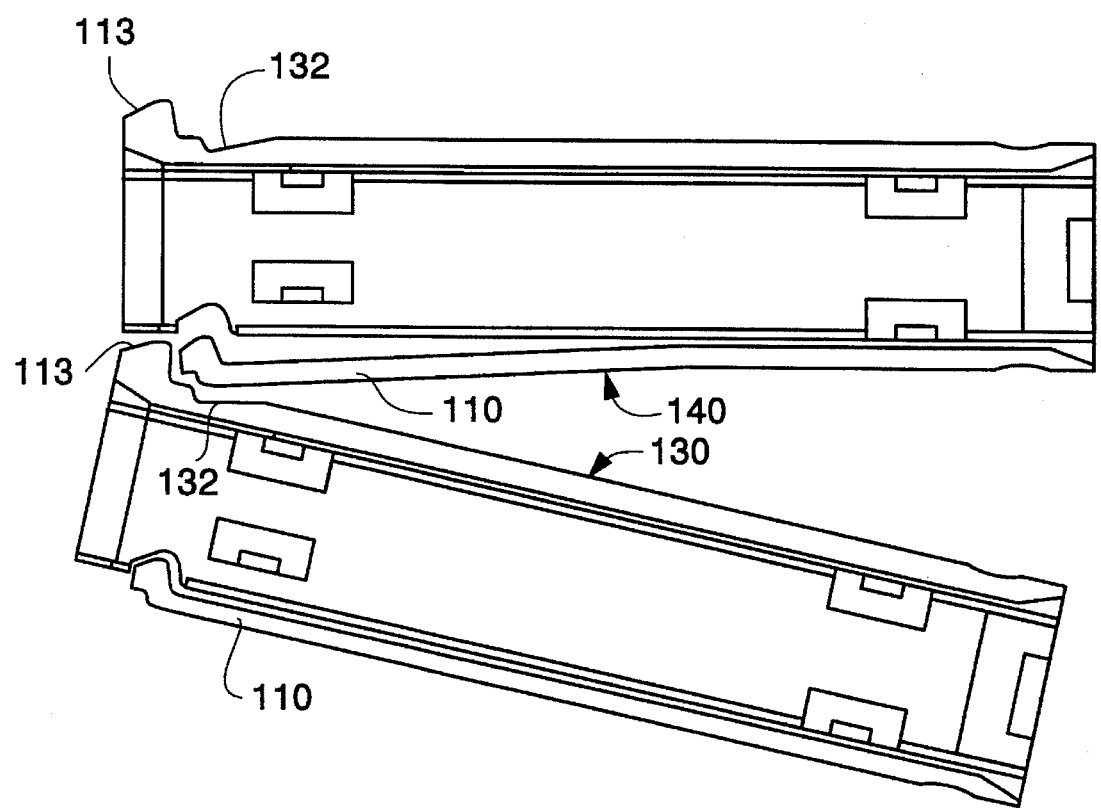
FIG. 10 is a top view of two adjacent slots.

With reference to FIG. 10, two adjacent guides 140 and 130 are shown. The guide 130 includes a recessed surface 132 on a side which limits the movement of an elastic member 110 of the adjacent guide 140 and thereby prevent overextension of the elastic member 110 which could cause breakage or inelastic deformation thereof. The ramp surface 113 of guide 130 forms a lead-in ramp that directs a cartridge into the adjacent guide 140.

The foregoing description of the invention has been presented for purposes of illustration and description. Further, the description is not intended to limit the variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A data cartridge library apparatus comprising:

storage array means for storing a plurality of data cartridges, wherein said storage array means includes a plurality of housings, each defining a slot, and each slot capable of accommodating a data cartridge and having a first opening through which a data cartridge can be moved;

player/recorder means for reading/writing data on a data cartridge; and picker means for moving a data cartridge between said storage array means and said player/recorder means;

wherein a first housing of said plurality of housings includes a top wall, a bottom wall that is substantially parallel to said top wall, a first lateral wall that is substantially perpendicular to said top walls, and a second lateral wall that is substantially parallel to said first lateral wall;

wherein said top, bottom, first lateral and second lateral wall of said first housing define at least part of said first opening;

wherein said first housing includes an elastic member for retaining a data cartridge within the housing that is made from the same piece of material as at least one of said top wall, said bottom wall, said first lateral wall, and said second lateral wall.

2. A data cartridge library apparatus, as claimed in claim 1, wherein:

said elastic member includes means for preventing insertion of a data cartridge which has an orientation that is different than a predetermined orientation.

3. A data cartridge library apparatus, as claimed in claim 1, wherein:

said first housing includes a removable tab means positioned opposite said first opening, wherein when said tab means is in place, said tab means aids in retaining a data cartridge within said housing, and when said tab means is removed creates a second opening that allows a data cartridge to pass between said first and second openings.

4. A data cartridge library apparatus, as claimed in claim 1, wherein:

said first housing further includes mounting clamp means and locating boss means for mounting and positioning said first housing adjacent to a second housing of said plurality of housings.

5. A data cartridge library apparatus, as claimed in claim 1, wherein:

a second housing of said plurality of housings includes means for limiting the movement of said elastic member of said first housing to prevent breakage thereof.

6. A data cartridge library apparatus, as claimed in claim 1, wherein:

a second housing of said plurality of housings is located adjacent to said first housing and includes means for guiding a data cartridge into said first housing.

7. A data cartridge library apparatus as claimed in claim 1, wherein:

said elastic member is formed from the same piece of material as at least part of said first lateral wall.

8. A data cartridge library apparatus, as claimed in claim 1, wherein:

said elastic member moves when a data cartridge is moved through said first opening.

9. A data cartridge library apparatus, as claimed in claim 8, wherein said elastic member substantially returns to its original position after the data cartridge is moved through said first opening.

10. A data cartridge library apparatus, as claimed in claim 1, wherein:

said first housing includes mounting clamp means and locating boss means for mounting and positioning said first housing within said storage array means.

11. A data cartridge library apparatus comprising:

storage array means for storing a plurality of data cartridges, wherein said storage array means includes a plurality of housings, each defining a slot, and each slot capable of accommodating a data cartridge and having a first opening through which a data cartridge can be moved;

entry/exit means for use in inserting/removing a data cartridge into/from said storage array;

player/recorder means for reading/writing data on a data cartridge; and picker means for moving a data cartridge between said storage array means and said player/recorder means;

wherein a first housing of said plurality of housings includes a top wall, a bottom wall that is substantially parallel to said top wall, a first lateral wall that is substantially perpendicular to said top wall, and a second lateral wall that is substantially parallel to said first lateral wall;

wherein said top, bottom, first lateral and second lateral walls of said first housing define at least part of said first opening;

wherein said top and bottom walls define a length of said first opening;

wherein said first lateral and second lateral walls define a width of said first opening that is less than said length of said first opening;

wherein one of said first lateral wall and said second lateral wall includes an elastic member that is displaced from a first position to a second position when a data cartridge is moved through said first opening and which substantially returns to said first position after the data cartridge is moved through said first opening.

12. A data cartridge library apparatus, as claimed in claim 11, wherein:

said elastic member includes means for preventing insertion of a data cartridge which has an orientation that is different than a predetermined orientation.

13. A data cartridge library apparatus, as claimed in claim 11, wherein:

said first and second lateral walls respectively include first and second upper portions that each extend from said top wall forming a first guide.

14. A data cartridge library apparatus, as claimed in claim 13, wherein:

said first and second lateral walls respectively include first and second lower portions that each extend from said bottom wall forming a second guide;

wherein said first upper portion is separated from said first lower portion;

wherein said second upper portion is separated from said first lower portion.

15. A data cartridge library apparatus, as claimed in claim 14, wherein:

said first and second guides are positioned within said storage array means such that opposite edges of a data cartridge slidably engage said first and second guides when the data cartridge is moved through said first opening.

16. A data cartridge library apparatus, as claimed in claim 11 wherein:

said elastic member is formed from the same piece of material as at least part of said first lateral wall.

17. A data cartridge library apparatus comprising:

storage array means for storing a plurality of data cartridges, wherein said storage array means includes a plurality of housings, each defining a slot, and each housing capable of accommodating a data cartridge and having a first opening through which a data cartridge can be moved;

player/recorder means for reading/writing data on a data cartridge; and picker means for moving a data cartridge between said storage array means and said player/recorder means;

wherein a first housing of said plurality of housings, includes:

a top guide; and a bottom guide positioned opposite said top guide such that opposite edges of a data cartridge slidably engage said top and bottom guides when the data cartridge is moved through said first opening;

wherein at least one of said top and bottom guides includes:

end tab means located opposite said first opening and capable of constraining further movement of a data cartridge within said first housing after the data cartridge is moved through said first opening; and first and second side walls for guiding a data cartridge within said first housing, wherein at least one of said first and second side walls includes an elastic member that is displaced from a first position to a second position when a data cartridge is moved through said first opening and which substantially returns to said first position after the data cartridge is moved through said first opening.

18. A data cartridge library apparatus, as claimed in claim 17, wherein:

said elastic member is made from the same piece of material as said guide.

19. A data cartridge library apparatus, as claimed in claim 17, wherein:

said top guide and said bottom guide are substantially identical.

20. A data cartridge library apparatus, as claimed in claim 17, wherein:

at least one of said top and bottom guides further include mounting clamp means and locating boss means for mounting and positioning said first housing within said storage array means.

21. A data cartridge library apparatus, as claimed in claim 17, wherein:

said end tab means is removable from said guide such that the removal of said end tab means creates a second opening through which a data cartridge can be moved that is different than said first opening.

22. A data cartridge library apparatus, as claimed in claim 17, wherein:

the other of said top and bottom guides includes an elastic member that is displaced from a first position to a second position when a data cartridge is moved through said first opening and which substantially returns to said first position after the data cartridge is moved through said first opening.

* * * * *

UNITED STATES PATENT AND TRADEMARK OFFICE
CERTIFICATE OF CORRECTION

PATENT NO. : 5,621,586

DATED : April 15, 1997

INVENTOR(S) : Bennett C. Hinnen, Hai T. Ho, Eric A. Rinard, Gregory S. Rinard, Brian A. Ruff, Nathan C. Thompson, and Hossein Zia-Shakeri It is certified that error appears in the above-indentified patent and that said Letters Patent is hereby corrected as shown below:

On the title page: Item [75]

Inventors: delete "Bennett C. Hinnen; Hai T. Ho, both of Westminster;"
delete "; Gregory S. Rinard, both";
delete "Brian A. Ruff, Denver;";
delete "; Hossein Zia-Shakeri, Louisville"

Item [56]
References Cited - U.S. Patent Documents
Insert the following:

| | | | |
|---|---|---|---|
| -- 3,378,827 | 04/16/68 | Hertrich | 360/92 |
| 3,484,055 | 12/16/69 | Raine | 360/92x |
| 3,938,190 | 02/10/76 | Semmlow et.al. | 360/72 |
| 4,251,177 | 02/17/81 | Neuhaeusser et.al. | 414/276 |
| 4,361,858 | 11/30/82 | Chambers | 360/92 |
| 4,779,151 | 10/18/88 | Lind et.al. | 360/92 |
| 4,812,629 | 03/14/89 | O'Neil et. al. | 235/383 |
| 4,932,826 | 06/12/90 | Moy et.al. | 414/277 |
| 4,937,690 | 06/26/90 | Yamashita et.al. | 360/92 |
| 4,945,429 | 07/31/90 | Munro et.al. | 360/92 |
| 5,143,193 | 06/26/90 | Geraci | 194/212 |
| 5,449,091 | 09/12/95 | Dalziel | 221/81 -- |

Signed and Sealed this

Nineteenth Day of August, 1997

*Attest:*

BRUCE LEHMAN

*Attesting Officer*  Commissioner of Patents and Trademarks